Sept. 6, 1932.                     H. FORD                       1,875,718
                                  LUBRICATION
                            Filed Aug. 18, 1927        2 Sheets-Sheet 1
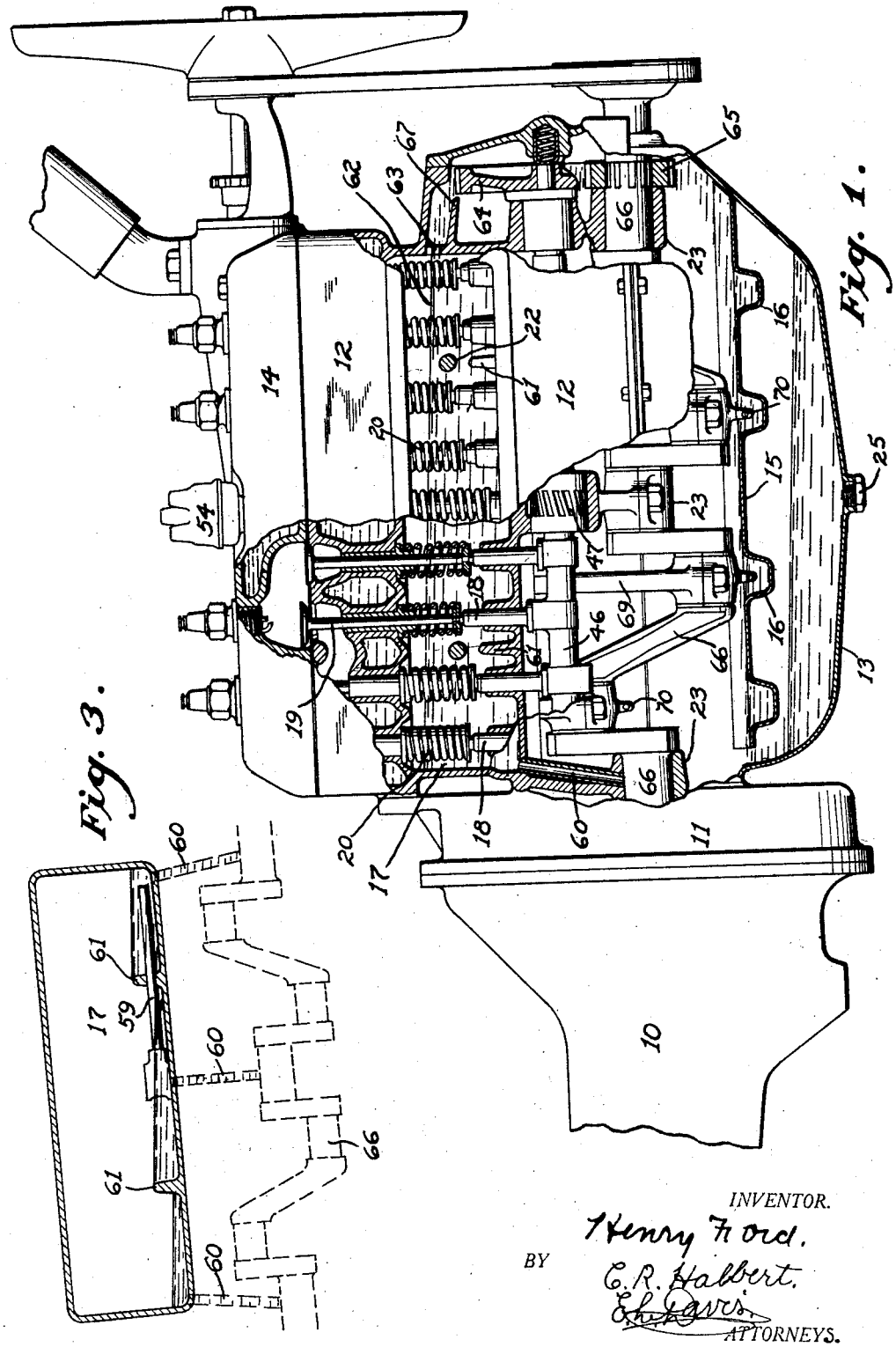
INVENTOR.
Henry Ford.
BY C. R. Halbert.
   ATTORNEYS.

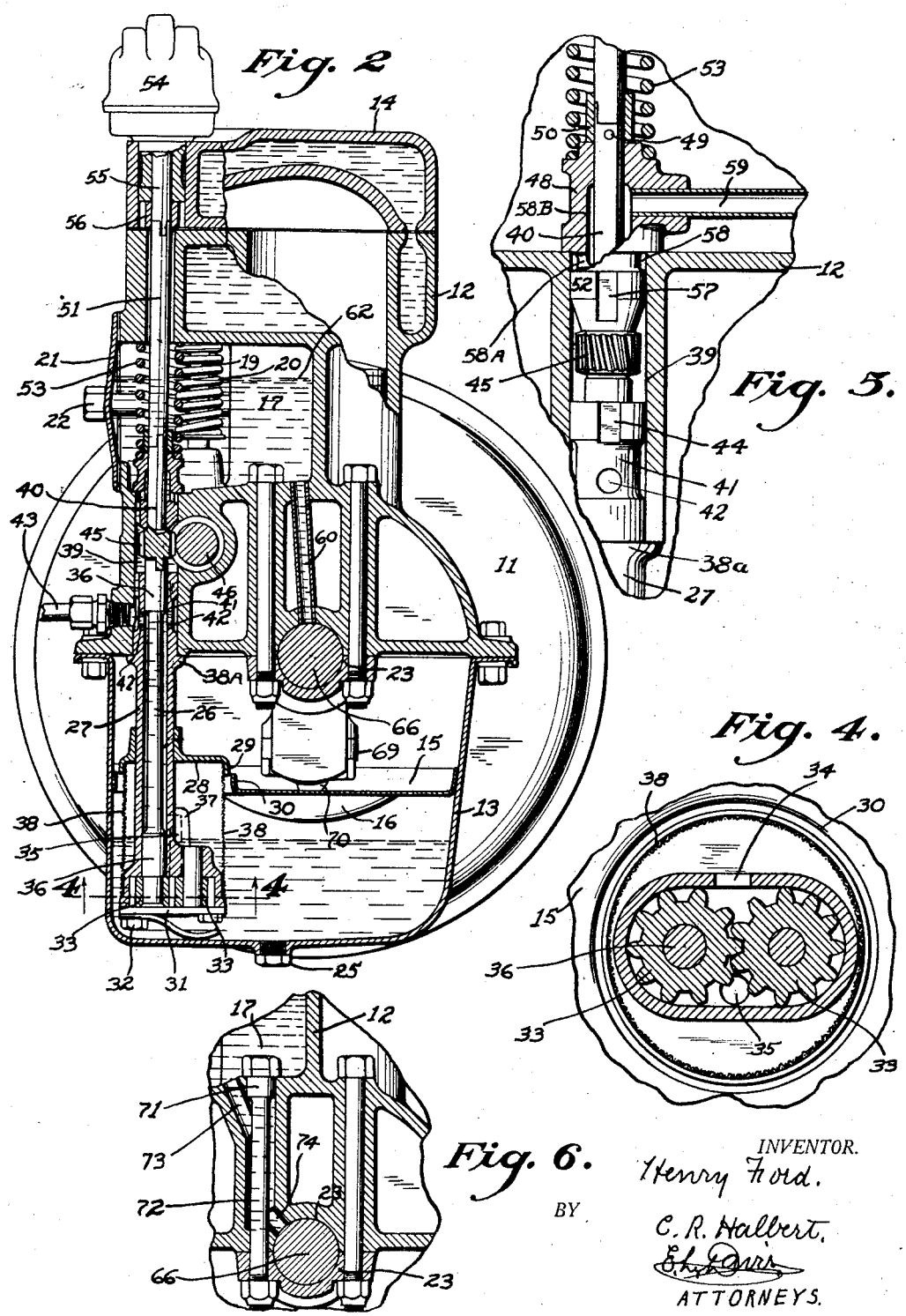

Patented Sept. 6, 1932

1,875,718

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

LUBRICATION

Application filed August 18, 1927. Serial No. 213,778.

The object of my invention is to provide a system of lubrication of simple, durable, and inexpensive construction.

Still a further object of my invention, is to provide a system of lubrication which is particularly well adapted for an internal combustion engine.

Still a further object of my invention is to provide a lubrication system for internal combustion engines wherein an upper and lower lubricant reservoir may be provided with means for carrying lubricating liquid from the lower to the upper reservoir, and then conducting the lubricating fluid from the upper reservoir by gravity to the various parts of the engine which require lubrication.

Still a further object of my invention is to provide an oil sump at the bottom of the crankcase of the engine of the internal combustion type and to provide an oil reservoir around the valve operating mechanism of the engine so that this oil will lubricate the valve mechanism and also silence the action thereof; and the oil may further flow through appropriate tubes from the reservoir down to the crankshaft bearings and the timing gear drive, or in fact into any place around the engine where lubrication is needed.

Still a further object of my invention is to provide a distributor driveshaft which may be operated by the time or camshaft and which may operate to drive the oil pump which forces the oil from the sump to the reservoir.

Still a further object of my invention is to provide in connection with such a distributor drive shaft, means for conducting the oil from the sump up through and around the distributor driveshaft to thereby lubricate same by the oil which is being conducted from the sump to the reservoir.

Still a further object of my invention is to provide an oil reservoir which may be kept full by the pump and to provide tubes from this reservoir down to the bearings whereby the oil may be fed by gravity under an appreciable pressure to said bearings to insure proper lubrication thereof.

Still a further object of my invention is to provide a reservoir up near the top of the engine and a sump near the bottom of the engine and an oil pump in the sump to raise the oil therefrom to the reservoir, the parts being so constructed that the oil pump may be mounted in the sump and will be carried by the sump when the latter is removed from the engine.

Still a further object of my invention is to provide a quick detachable drive connection between the pump shaft and the distributor shaft so that when the pump is mounted in the oil pan or sump of the engine and carried thereby, then when the oil pan is removed the oil pump may be carried thereby and may be replaced when the oil pan is replaced without inconvenience.

With these and other objects in view my invention consists in the arrangement, combination, and construction of the various parts of my improved device, as described in the specifications, claimed in the claims and illustrated in the accompanying drawings, in which Figure 1 shows a side elevation of an engine, parts being broken away to better illustrate the construction.

Figure 2 shows a vertical, transverse, sectional view of the engine shown in Figure 1, the section being taken along the center line of the distributor drive shaft.

Figure 3 shows a diagrammatic view illustrating the circulation of the oil from the reservoir to the crankshaft, and the means for insuring that all of the crankshaft bearings will be lubricated as soon as possible after the engine has been started.

Figure 4 shows a horizontal sectional view taken on the line 4—4 of Figure 2.

Figure 5 shows an enlarged detail sectional view illustrating the manner of conducting the oil from the distributor driveshaft to the oil reservoir, and Figure 6 shows an enlarged detail vertical sectional view illustrating an alternative manner of conducting the oil from the reservoir to the crankshaft bearings.

Referring to the accompanying drawings, I have used the reference numeral 10 to indicate the transmission housing of an internal combustion engine, having a flywheel housing 11 secured thereto. The engine also has the cylinder block 12 which is associated with the oil pan or sump 13 to complete a closure for the single engine. A detachable cylinder head 14 of ordinary construction is secured to the top of the cylinder block 12. These parts are of ordinary construction and form no part of my invention except in so far as they are modified to cooperate with the parts of my improved lubricating system.

The oil pan 13 is provided with a horizontal partition or splash pan 15 which is provided with a plurality of oil troughs 16. It will be understood that the cylinder block 12 is provided with a valve inspection chamber and oil reservoir 17 therein designed to receive the valve tappets 18, the valve stems 19 and the valve operating springs 20. This chamber is designed to be closed by an inspection plate 21 which is secured to the cylinder block 12 by means of machine screws 22. It is this chamber which I propose to use for the oil reservoir so that it may be filled substantially full with lubricating oil whenever the engine is operating.

The cylinder block 12 is provided with the usual crankshaft main bearings 23. A drain plug 25 is screwed into the bottom of the oil sump 13. From the foregoing it will be seen that tubes may be extended from the reservoir 17 to the bearings 23 to oil them and the overflow from the reservoir may oil the timing gears, and then flow to the troughs 16 to oil the remaining engine parts. All surplus oil flows to the sump 13 and is pumped back to the reservoir 17. The oil pump has the drive shaft 26 journalled in sleeve 27, which in turn has the annular flange 28 extended therefrom intermediate of the ends thereof. This flange 28 has a downwardly extending annular flange 29 at the edge thereof whereby these flanges may cooperate with a similar flange 30 surrounding an opening in the splash pan 15 to locate the pump and to prevent flow of oil from the splash pan to the sump except at the rear end thereof.

A plate 31 is secured by cap screws 32 to the enlarged bottom of the oil pump driveshaft sleeve 27 so that these two parts may together house the pump gears 33 which are arranged to draw oil in through the opening 34 and force it out through the outlet opening 35 into the sleeve 27.

It will be noted that this sleeve is of sufficient diameter to receive the enlarged end 36 of the pump driveshaft 26. This leaves a passageway through the sleeve 27 throughout the major portion of its length around the shaft 26. The oil outlet opening 35 extends up through a boss 37 extended from the sleeve 27 to communicate with the interior of the sleeve 27 above the lower and large ends 36 of the driveshaft 26. A cylindrical screen 38 extends between the flange 28 and the enlarged bottom of the housing 27 so that oil which enters the opening 34 may be drawn through this screen to free the oil of impure or foreign matter.

The upper end of the sleeve 27 is provided with an annular shoulder 38a designed to bear against a bottom of the cylinder block 12, and above this shoulder 38, the sleeve 27 is provided with a pilot 75 designed to enter a vertical bore 39 in the cylinder block 12 in which the distributor shaft 40 is disposed. Intermediate of the ends of this pilot portion, a channel 41 is formed. There are a plurality of openings 42 through the wall of the sleeve 27 into the channel 41 to permit the oil from the interior of the sleeve 27 to flow out into the channel 41. An oil pressure line 43 is extended into the cylinder block 12 opposite the channel 41 and into the opening 39 so that when oil is being received from the pump the pressure thereof may be recorded by any suitable indicating instrument which may be connected with the oil pressure line 43. The bearing portion of the sleeve 27 above the opening 42 is provided with a plurality of vertical oil grooves 44 so that the oil received from the interior of the sleeve 27 and the openings 42 may pass up around the pilot and into the portion of the bore 39 which houses the distributor drive gear 45.

The cylinder block 12 is provided with suitable bearings for mounting the camshaft 46. This camshaft is provided with an enlarged central bearing portion at about the middle thereof which has teeth 47 cut therein so that it forms a worm which drives the distributor drive gear 45. This oil which is received from the sleeve 27 thus serves to oil the driving connection between the distributor drive shaft 40, and the cam shaft 46.

The distributor drive shaft is preferably mounted in a sleeve member to which I have given the general reference numeral 48. It should be noted that in the form of device here illustrated, the distributor drive gear 45 is formed integrally with the distributor drive shaft 40. The contact of the upper surface of the distributor drive gear with the lower end of the sleeve 48 serves to locate the distributor drive shaft 40 within the sleeve 48 and to hold it from vertical movement in one direction. Movement of the shaft 40 in the opposite direction is prevented by means of a cotter 49 which extends through a sleeve 50 on the upper end of the distributor shaft. This sleeve 50 serves to locate a second section 51 of the distributor drive shaft. The lower end of the sleeve 48 is provided with a pilot portion 52 designed to enter the upper end of the bore 39 to thereby center and locate the distributor driveshaft 40 and consequently the distributor drive gear 45. This sleeve 48 is held in position in the opening 39 by a valve spring 53 which extends from the upper end of said sleeve 48 to the top of the oil reservoir 17 and bears against the top thereof to yieldingly urge sleeve 48 into position and to prevent any except intentional removal of said sleeve 48.

The distributor head 54 has the distributor head operating shaft 55 extending downwardly therefrom to form the 3rd or upper section of the distributor drive shaft. The sections 51 and 55 are connected together by a one way slip joint connection 56 so that the distributor head may be readily removed from the cylinder head 14 or the latter may be removed from the cylinder block 12.

The pilot 52 of the sleeve 48 is provided with a plurality of vertical oil grooves 57 which communicate with an annular horizontal oil channel 58 in the surface of the pilot 52. A plurality of oil ducts 58a extend through the sleeve 48 so that oil from the bore 39 may pass up through oil grooves 57 channels 58 and the oil ducts 58a into a recess 58b in the sleeve 48 around the shaft 40. An oil pipe 59 carries the oil from the recess 58b to the forward end of the reservoir 17.

An oil pipe 60 conducts the oil from the reservoir 17 by gravity and under some pressure to each of the main crankshaft bearings 23. A plurality of partitions 61 are provided across the bottom of the reservoir 17 so that a pool of oil will be formed above each of the oil pipes 60 almost as soon as the engine starts. This insures that all the main bearings will commence to receive oil immediately, as otherwise the front bearings would not be lubricated until some time after the rear bearings had commenced to receive oil. As the engine continues operation, the oil from the pump will continue to fill up the reservoir 17 until it reaches the level which is indicated by the dotted lines 62 in Figure 1. It will be noted that at approximately this level an outlet 63 is provided which permits the oil in the reservoir 17 to overflow into the forward end of the crankcase where the time gears are housed. These time gears 64 and 65 are secured respectively to the camshaft 46 and the crankshaft 66. An apron 67 is formed integrally with the cylinder block 12 in position to conduct the oil from the outlet 63 to position where it will fall on the said timing gears and insure lubrication thereof. This oil from the time gears runs down into the forward end of the splash pan 15 and into the successive oil troughs 16 therein. The connecting rods 69 have spoons 70 at the lower end thereof designed to pick up the oil from the dip troughs 16 to lubricate the connecting rod bearings and the camshaft bearings.

In Figure 6 I have shown a very slight variation of my improved device in which the opening around the main bearing bolts 71 is enlarged to form a passageway 72 from the reservoir 17 down to the main crankshaft bearing 23. A communicating passageway 73 from the reservoir 17 to the passageway 72 and a second passageway 74 from the passageway 72 to the bearing 23 completes the duct for the oil communication between the reservoir 17 and the main crankshaft bearing 23. This structure under certain circumstances forms a better method of conveying the oil to the crankshaft main bearings.

Among the many advantages derived from the use of my improved device it should be first noted that it provides a means for conveying oil to any desired bearing under a definite pressure without the use of a pressure regulator or other oil flow control device. It should next be pointed out that the lubrication herein provided automatically silences as much as possible the noise of the operation of the valves. By my improved method of lubrication I am further enabled to lubricate the distributor shaft and its associated pipes by the oil from the pump with a minimum of extra pieces or production. Still a further advantage results from the fact that the crankshaft main bearings will each start to receive lubrication from the oil pump almost as soon as the engine is started. Still a further advantage results from the fact that the mounting of the parts permits the oil pump to be removed with the oil pan so that it does not interfere with motor repairs or adjustments when the oil pan is removed.

Some changes may be made in the arrangement, construction, and combination of the various parts of my improved device, and it is my intention to cover by my claims such changes as may reasonably be included within the scope thereof.

I claim as my invention:

1. In a device of the character described, a cylinder block having a vertical distributor drive shaft therein and a bearing and a valve inspection chamber into which the distributor drive shaft extends, an oil pan secured below the cylinder block, an oil pump disposed in the oil pan and operatively connected with the distributor drive shaft, means for carrying the oil from the oil pump through and around the distributor and pump drive shaft up to the valve inspection chamber, and means for conveying oil from the valve inspection chamber to said bearings, whereby the valve inspection chamber becomes an oil reservoir and the oil therein may lubricate said bearings and silence said valves.

2. In a device of the character described, a cylinder block having a vertical distributor drive shaft therein and a valve inspection chamber into which the distributor drive shaft extends, an oil pan secured below the cylinder block, an oil pump disposed in the oil pan and driven by the lower end of the distributor drive shaft, and means forming a passageway through the cylinder block from the pump to the valve inspection chamber whereby oil from the pump may be forced up around the distributor drive shaft and into the valve inspection chamber to cause the latter to form an elevated oil reservoir, the parts being so arranged that the oil from the pump may serve to lubricate the distributor driveshaft while passing upwardly through the passageway therefor.

3. In a device of the character described, a cylinder block having an oil receiving space near the top thereof, an oil pan secured to the cylinder block, a distributor and oil pump drive shaft extended from said oil pan upwardly to position adjacent to said space, a sleeve mounted in said cylinder block around said shaft, an oil pump at the lower end of said sleeve, and means forming an oil passageway around said shaft and in said sleeve whereby oil from the pump may be forced upwardly through said passageway around said shaft and to said space, the parts being so arranged that the oil passing through said passageway may lubricate said shaft.

4. In a device of the character described, a cylinder block having a horizontal cam shaft rotatably mounted therein, a perpendicular pump shaft, an oil pump disposed in the engine oil pan operated by said pump shaft, co-acting gears on the pump shaft and cam shaft, and a tube enclosing the pump shaft to convey the oil from the pump up and around the gears to properly lubricate same.

5. In a device of the character described, a cylinder block having a horizontal cam shaft rotatably mounted therein, a vertical bore in said block intersecting the cam shaft, a pump shaft disposed in the vertical bore, a bearing for the pump shaft co-acting with the vertical bore to form an oil chamber adjacent to the point of intersection, co-acting gears on said shafts within the oil chamber adapted to drive the oil pumps, and means for conducting oil from said pump to the oil chamber to properly lubricate the gears.

6. In a device of the character described, a cylinder block, a tubular bracket extending downwardly from the block having an oil pump secured thereto, a drive shaft for the pump extending upwardly through said tubular bracket, a drive gear secured on the upper end of the shaft, and means for conveying the oil from the pump up through the tube and around the drive gear to properly lubricate the gear.

HENRY FORD.